US012179508B2

(12) United States Patent
Gnanadoss et al.

(10) Patent No.: US 12,179,508 B2
(45) Date of Patent: Dec. 31, 2024

(54) NON-SMEAR NIB AND ASSOCIATED WRITING INSTRUMENTS

(71) Applicant: Sanford L.P., Atlanta, GA (US)

(72) Inventors: Vasanth Andrew Gnanadoss, Sandy Springs, GA (US); Brojokishore Chowdhury, Bengaluru (IN); Nataly Thiry Munoz, Cumming, GA (US)

(73) Assignee: Sanford, L.P., Atlanta, GA (US)

( * ) Notice: Subject to any disclaimer, the term of this patent is extended or adjusted under 35 U.S.C. 154(b) by 0 days.

(21) Appl. No.: 17/376,596

(22) Filed: Jul. 15, 2021

(65) Prior Publication Data

US 2022/0041006 A1 Feb. 10, 2022

Related U.S. Application Data

(60) Provisional application No. 63/060,753, filed on Aug. 4, 2020.

(51) Int. Cl.
*B43K 1/12* (2006.01)
*B43K 1/00* (2006.01)
*B43K 8/02* (2006.01)
*B43K 8/06* (2006.01)

(52) U.S. Cl.
CPC ................ *B43K 1/12* (2013.01); *B43K 1/006* (2013.01); *B43K 8/022* (2013.01); *B43K 8/06* (2013.01)

(58) Field of Classification Search
CPC . B43K 1/006; B43K 1/12; B43K 8/02; B43K 8/022; B43K 8/024; B43K 8/026; B43K 8/028
USPC .......................................................... 401/198
See application file for complete search history.

(56) References Cited

U.S. PATENT DOCUMENTS 3,003,181 A * 10/1961 Rosenthal .............. B43K 8/024 401/199
3,993,409 A * 11/1976 Hart ..................... B43K 11/005 401/199
RE30,659 E * 6/1981 Otake ...................... B43K 1/12 401/292
4,749,618 A * 6/1988 Kawaguchi .............. B43K 1/12 428/397

(Continued)

FOREIGN PATENT DOCUMENTS

FR 2310886 A1 * 12/1975

OTHER PUBLICATIONS

EPO, “European Search Report” Application No. 21188586.8, dated Dec. 6, 2021, 7 pages.

*Primary Examiner* — David P Angwin
*Assistant Examiner* — Bradley S Oliver
(74) *Attorney, Agent, or Firm* — Eversheds Sutherland (US) LLP

(57) ABSTRACT

Writing instruments with flexible nibs for reduced writing force in use are provided. A nib includes a nib body having a flexible upper writing portion and a lower portion in communication with the flexible upper writing portion, the lower portion of the nib body being configured to deliver ink to the flexible upper writing portion and the flexible upper writing portion being configured to deliver ink to a writing surface, wherein the flexible upper writing portion of the nib body has a flattened chisel-shaped tip at a superior end of the flexible upper writing portion, and wherein the nib is effective to deliver ink to the writing surface upon application of a force of less than about 0.1 lbs thereto.

18 Claims, 6 Drawing Sheets

(56) References Cited

U.S. PATENT DOCUMENTS

| | | | | | |
|---|---|---|---|---|---|
| 4,838,723 | A * | 6/1989 | Suzuki | B43K 1/12 | 401/265 |
| 6,059,477 | A | 5/2000 | Dunlap, Jr. et al. | | |
| 6,659,672 | B1 | 12/2003 | Kirita | | |
| 6,887,504 | B2 * | 5/2005 | Palmer | A23G 3/28 | 426/115 |
| 9,566,818 | B2 | 2/2017 | Kamitani et al. | | |
| 9,908,362 | B2 * | 3/2018 | Yasumi | B43K 8/08 | |
| 2007/0212158 | A1 * | 9/2007 | Timm | B43K 1/006 | 401/198 |
| 2008/0197065 | A1 | 8/2008 | Wingo et al. | | |
| 2008/0213031 | A1 | 9/2008 | Castner et al. | | |

* cited by examiner

NON-SMEAR NIB AND ASSOCIATED WRITING INSTRUMENTS

CROSS-REFERENCE TO RELATED APPLICATION

This application claims priority benefit of U.S. Provisional Application No. 63/060,753, filed Aug. 4, 2020, the disclosure of which is incorporated by reference herein in its entirety.

FIELD OF THE DISCLOSURE

This disclosure relates generally to writing instruments and, in particular, relates to writing instruments having flexible nibs.

BACKGROUND

Highlighting writing instruments, such as traditional highlighter pens, are designed to be used over existing text, such as handwritten ink or printed text. Traditional highlighters have a reservoir containing highlighting ink that is delivered from a nib at the tip of the highlighter. The shape and material used for the nib in traditional highlighter pens typically results in a firm nib that requires substantial application force to induce transfer of ink to the writing surface. Depending on the type of ink in the underlying text, the requisite amount of application force results in increased abrasion of the nib against the writing surface and can smear the text, degrading the quality of the text and the highlighting.

Furthermore, traditional highlighters feature a rigid chisel nib that results in varying line widths depending on the writing angle. Due to the rigidity and geometry of the traditional chisel nib, a low surface area contacts the substrate when the highlighter is held perpendicular to the substrate, i.e., at an angle of 90°, and a thin line width is drawn. When the highlighter is held at an angle to the substrate, such as at an angle of 60°, a greater surface area contacts the substrate and a wider line width is drawn. As a result, users typically adjust their grip on the highlighter, highlight the same line multiple times, and/or produce irregular highlighting profiles.

Attempts have been made to solve this issue. Highlighter ink has been formulated so as to avoid smearing a specific ink type, such as gel ink, but this highlighter ink may smear other types of ink and is itself prone to smearing. Furthermore, attempts at new highlighter ink formulations result in increased bleed-through of the highlighter ink through the substrate, or the drying time of the highlighter ink may be increased. Further still, typical highlighter pens feature a hard, rigid nib that requires the user to apply a significant amount of pressure in order to use the highlighter, increasing the possibility and severity of smearing or bleed-through. Attempts to implement a more flexible nib typically use a paintbrush-style nib that requires users to learn a new method of highlighting.

Attempts to replace the traditional highlighter pen include highlighter tape, tape rollers, and highlighter pencils. However, each of these solutions suffer from their own drawbacks, such as the increased likelihood of mechanical failure or reduced highlighting line width. Additionally, alternatives to traditional highlighter pens require the user to adapt to a new method of highlighting.

Thus, writing instruments having nibs and inks that result in reduced or no smearing would be beneficial.

SUMMARY

In one aspect, nibs for writing instruments are provided. A nib includes a nib body having a flexible upper writing portion and a lower portion in communication with the flexible upper writing portion, the lower portion of the nib body being configured to deliver ink to the flexible upper writing portion and the flexible upper writing portion being configured to deliver ink to a writing surface, wherein the flexible upper writing portion of the nib body has a flattened chisel-shaped tip at a superior end of the flexible upper writing portion, and wherein the nib is effective to deliver ink to the writing surface upon application of a force of less than about 0.1 lbs thereto.

In another aspect, writing instruments are provided, including the nibs described herein. A writing instrument includes an elongated body having an ink reservoir and a nib disposed at an end of the elongated body and in fluid communication with the ink reservoir, wherein the flexible upper writing portion of the nib body protrudes outside of the elongated body.

BRIEF DESCRIPTION OF THE DRAWINGS

The detailed description is set forth with reference to the accompanying drawings. The use of the same reference numerals may indicate similar to identical items. Various embodiments may utilize elements and/or components other than those illustrated in the drawings, and some elements and/or components may not be present in various embodiments. Elements and/or components in the figures are not necessarily drawn to scale.

DETAILED DESCRIPTION

Figure 1A:
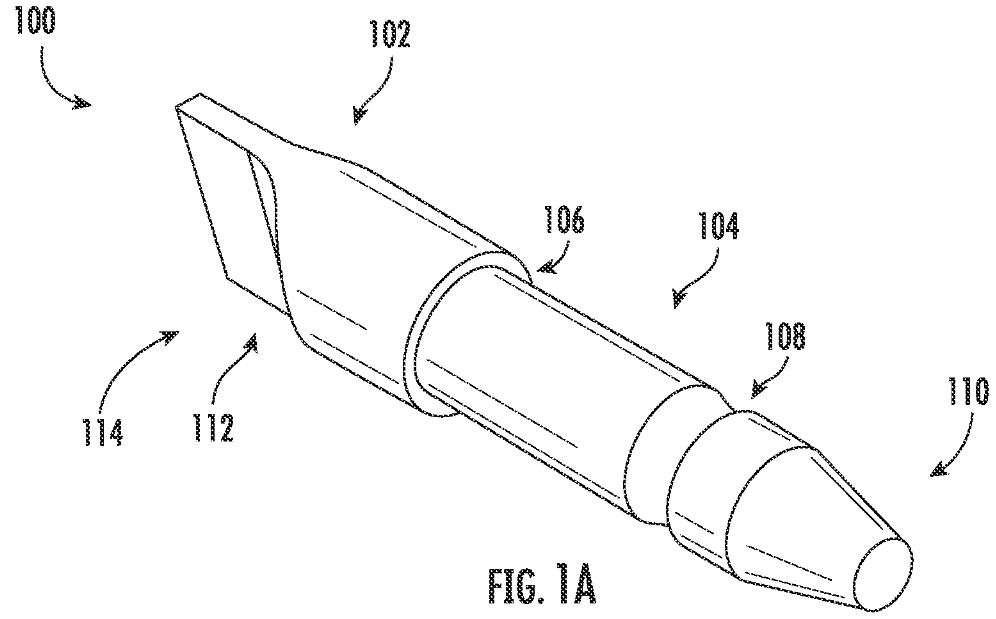
FIG. 1A is a perspective view of a nib in accordance with the present disclosure.

Writing instruments and associated nib assemblies are provided herein. The writing instruments and associated nib assemblies advantageously reduce the smearing of text over which the nib is used, such as text to be highlighted. The present disclosure includes non-limiting embodiments of writing instruments and nibs. The embodiments are described in detail herein to enable one of ordinary skill in the art to practice the writing instruments and associated nib assemblies, although it is to be understood that other embodiments may be utilized and that logical changes may be made without departing from the scope of the disclosure. Throughout the disclosure, depending on the context, singular and plural terminology may be used interchangeably.

Throughout this disclosure, various aspects are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual numbers within that range, for example, 1, 2, 3, 4, 5, and 6. This applies regardless of the breadth of the range.

The nibs of the present disclosure are flexible. Flexible nibs are nibs that predictably deform when pressed against a substrate. For example, highlighter pens, dry erase markers, permanent markers, felt-tip pens, and the like may use a flexible nib that generally maintains its shape until pressed against a substrate. In the present disclosure, the flexible nibs have an end that is formed into a flattened chisel-shape that predictably deforms, thereby making them effective at delivering ink to a writing surface upon application of a lesser force, reducing the effective application force and reducing mechanical abrasion while maintaining a familiar form-factor. As such, the present nibs may provide a means by which users can write over underlying text using, e.g., a highlighter, with a reduced likelihood of smearing the underlying text.

As used herein, the term "mechanical abrasion" refers to the friction that results from dragging a nib across the surface of a writing surface, such as through the process of highlighting text.

Another advantage of the present flexible nib is the ability to mark with multiple line widths based on the pressure applied. For example, a light amount of application force will result in a line width approximately equal to the thickness of the flattened chisel-shaped end of the nib, while a higher amount of application force will result in deformation of the flattened chisel-shaped end of the nib and an increased line width.

Another advantage of the present flexible nib is the ability to mark with the same line width regardless of the writing angle. For example, a highlighter pen equipped with the present flexible nib draws a first line width when held perpendicular to the substrate, e.g., at an angle of 90°, and the same line width when held at an angle to the substrate, such as at an angle of 60°. Thus, a user drawing a line with the present flexible nib requires fewer regrips when writing and will need to highlight the same text fewer times when writing.

As used herein, a "regrip" refers to when a user stops writing, adjusts their grip on the writing instrument, and resumes writing.

The present flexible nib may also be used to mark on surfaces with different porosities and surface finishes without damaging the substrate. The flexible nib may also be implemented in a writing instrument familiar to the user, so that there is no need to adapt to a new method of highlighting.

The present flexible nib may be formed out of any suitable material including, but not limited to, nylon 6, acrylic fiber, polyester fiber, nylon fiber, porous ceramic, synthetic fiber, synthetic felt, polyethylene, a porous plastic, felt, or a combination thereof.

Nibs and writing instruments incorporating such nibs are discussed below. The nibs are flexible and shaped into a flattened chisel-shape that predictably deforms and is effective to deliver ink to the writing surface upon application of less application force than rigid nibs.

Nibs

Nibs for writing instruments are disclosed herein. In one aspect, the nib may be formed from a nib body including a flexible upper writing portion and a lower portion that are in communication with each other. The flexible upper writing portion may be designed to deliver ink to a writing surface. The flexible upper writing portion of the nib may include a flattened chisel-shaped tip at a superior end of the flexible upper writing portion. The nib may be effective to deliver ink to the writing surface upon application of a force of less than about 0.1 lbs thereto.

As used herein, the term "flexible" refers to the ability to deform from a standby position when pressed against a writing surface and return to the standby position upon removal from the writing surface.

As used herein, the terms "force" and "application force" refer to the amount of force required when highlighting text to transfer ink from the nib to a writing surface.

As used herein, the term "about" refers to ±20% of the stated value. For example, the term "about" may mean±5% of the stated value, ±10% of the stated value, ±15% of the stated value, ±20% of the stated value, or any range therebetween.

In some embodiments, the nib is monolithic. As used herein, "monolithic" refers to a single, homogenous structure having a continuous composition throughout. In other embodiments, the nib is formed by two or more portions that are operatively coupled in fluid communication with one another, to effectively transfer ink between or along the two or more portions.

In some embodiments, the flexible upper writing portion and the lower portion are defined by a hypothetical or physical middle boundary. In some embodiments, the flexible upper writing portion and the lower portion are substantially equal in area, i.e., the middle boundary is positioned at a midpoint of a longitudinal axis of the nib. In other embodiments, the middle boundary may be positioned such that the lower portion has an area greater than that of the flexible upper writing portion. In other embodiments, the middle boundary may be positioned such that the lower portion has an area lesser than that of the flexible upper writing portion.

The lower portion of the nib body is designed to deliver ink to the flexible upper writing portion, such as along the surface thereof or via the porous material forming the nib or the lower portion thereof. The lower portion may be at least partially cylindrical, and may include a groove for securing the nib in a writing instrument. In some embodiments, an inferior end of the lower portion of the nib body has a truncated-cone shape.

In some embodiments, the flexible upper portion of the nib body is cylindrical at the middle boundary. The flexible upper portion may have a first diameter at the middle boundary, and the lower portion may have a second diameter at the middle boundary. In some embodiments, the first diameter of the flexible upper portion is greater than the second diameter of the lower portion.

In some embodiments, the diameter of the lower portion tapers along the cone shape at the inferior end of the lower portion from the second diameter to a third diameter. In some embodiments, the groove in the lower portion has a fourth diameter. The fourth diameter may be less than the second diameter, so that the groove is recessed within the lower portion.

In some embodiments, the flattened chisel-shaped tip may have a lower tapered portion and an upper blade portion. The upper blade portion of the flattened chisel-shaped tip may have a width that is less than, greater than, or equal to the first diameter of the flexible upper writing portion, such as less than half the diameter of the flexible upper writing portion. The upper blade portion may be angled relative to a perpendicular defined by a longitudinal axis of the nib body.

In some embodiments, the upper blade portion has a thickness of from about 0.2 mm to about 2 mm. For example, the thickness of the upper blade portion may be about 0.2 mm, about 0.6 mm, about 1 mm, about 1.4 mm, about 1.8 mm, about 2 mm, or any thickness therebetween.

In some embodiments, the first diameter of the flexible upper writing portion is from about 4 mm to about 8 mm. For example, the first diameter of the upper writing portion may be about 4 mm, about 5 mm, about 6 mm, about 7 mm, about 8 mm, or any diameter therebetween. In one embodiment, the first diameter of the upper writing portion is about 6 mm. In some embodiments, the second diameter of the lower portion is from about 3 mm to about 7 mm. For example, the second diameter of the lower portion may be about 3 mm, about 4 mm, about 5 mm, about 6 mm, about 7 mm, or any diameter therebetween. In one embodiment, the second diameter of the lower portion is about 5 mm.

In some embodiments, the third diameter of the cone shape at the inferior end of the lower portion is from about 1 mm to about 5 mm. For example, the third diameter of the cone shape at the inferior end of the lower portion may be about 1 mm, about 2.5 mm about 4 mm, about 5 mm, or any diameter therebetween. In one embodiment, the third diameter of the cone shape at the inferior end of the lower portion is about 3 mm. In some embodiments, the fourth diameter of the groove in the lower portion is from about 2 mm to about 7 mm. For example, the fourth diameter of the groove in the lower portion may be about 2 mm, about 3.5 mm, about 4.5 mm, about 5.5 mm, about 6 mm, about 7 mm, or any diameter therebetween. In one embodiment, the fourth diameter of the groove in the lower portion is about 4.5 mm.

In some embodiments, the groove has a width, measured along a longitudinal axis of the nib, of from about 1 mm to about 4 mm. For example, the width of the groove may be about 1 mm, about 2.25 mm, about 3.75 mm, about 4 mm, or any width therebetween. In one embodiment, the width of the groove is about 2.5 mm.

In some embodiments, the nib body has a length of from about 15 mm to about 45 mm. For example, the nib body may have a length of about 15 mm, about 21 mm, about 27 mm, about 33 mm, about 39 mm, about 45 mm, or any length therebetween. In one embodiment, the nib body has a length of about 30 mm. In some embodiments, the nib body has a length-to-width ratio of about 1:1, about 1.5:1, about 2:1, about 2.5:1, about 3:1, about 3.5:1, about 4:1, or any ratio in between depending on the desired nib and writing instrument properties.

In some embodiments, the nib is effective to deliver ink to a writing surface upon application of a force of less than about 0.1 lbs thereto. For example, the nib may be effective to deliver ink to the writing surface upon application of force of about 0.06 lbs, about 0.07 lbs, about 0.08 lbs, about 0.09 lbs, about 0.1 lbs, or any force therebetween. In some embodiments, the nib is effective to deliver ink to the writing surface upon application of a force of from about 10% to about 50% of an effective application force for a non-flexible nib. For example, the nib is effective to deliver ink to the writing surface upon application of a force of about 10%, about 25%, about 33%, about 50%, or any fraction of an effective application force for a non-flexible nib therebetween.

FIG. 1A is a perspective view of a nib 100 including a nib body having a flexible upper writing portion 102 and a lower portion 104 that are in communication with each other, with the flexible upper writing portion 102 designed to deliver ink to a writing surface (not shown). Flexible upper writing portion 102 and lower portion 104 are joined at a middle boundary 106. Lower portion 104 includes a groove 108 for securing the nib in a writing instrument. An inferior end 110 of the lower portion 104 has a cone shape. Flexible upper writing portion 102 includes a flattened chisel-shaped tip 112 at a superior end 114 of the flexible upper writing portion 102.

Figure 1B:
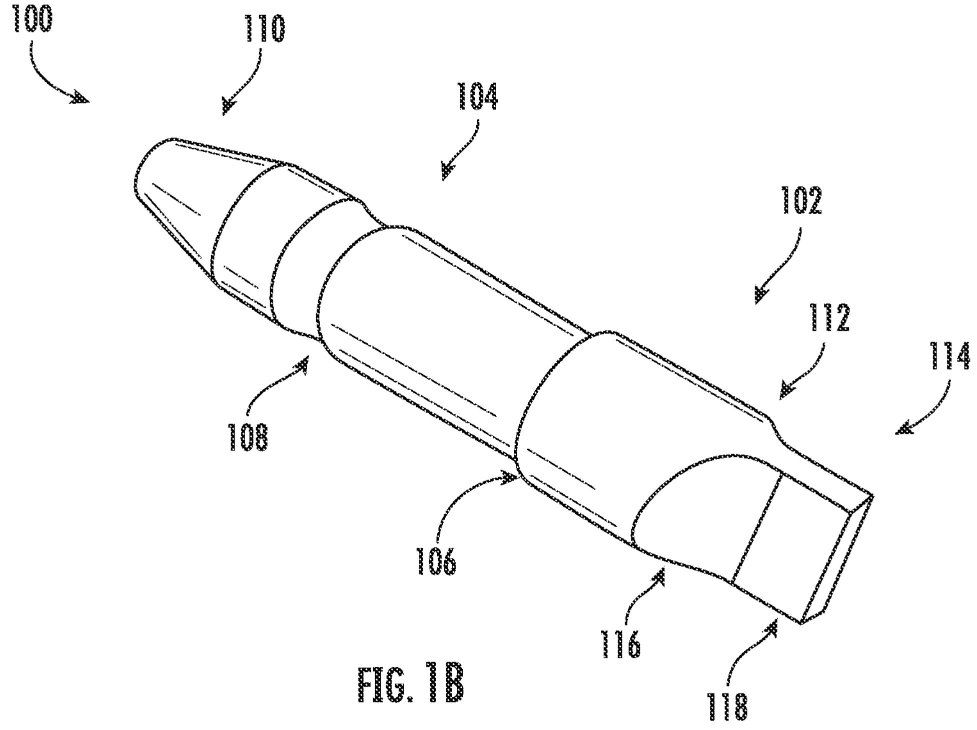
FIG. 1B is another perspective view of the nib of FIG. 1A.
Figure 2A:
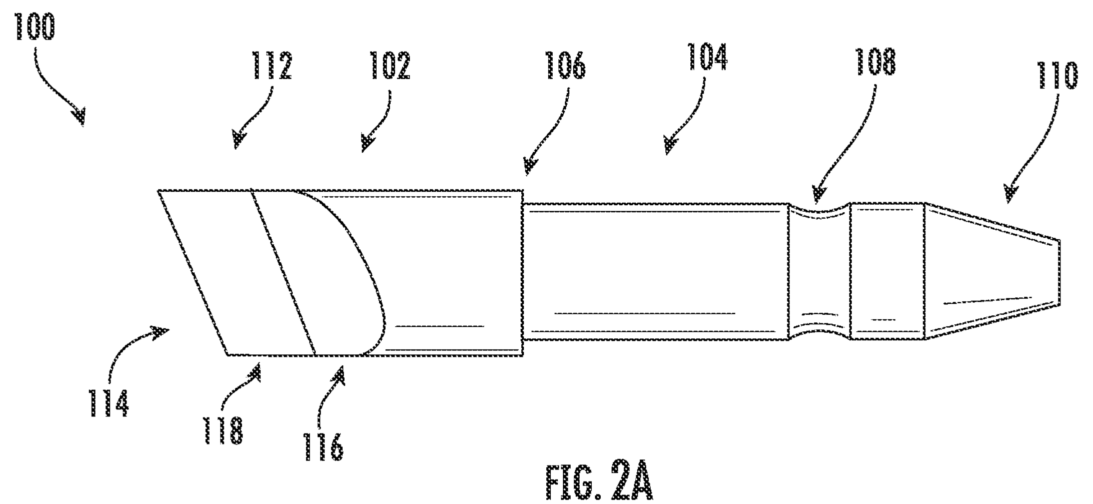
FIG. 2A is a side-view of a nib in accordance with the present disclosure.
Figure 2B:
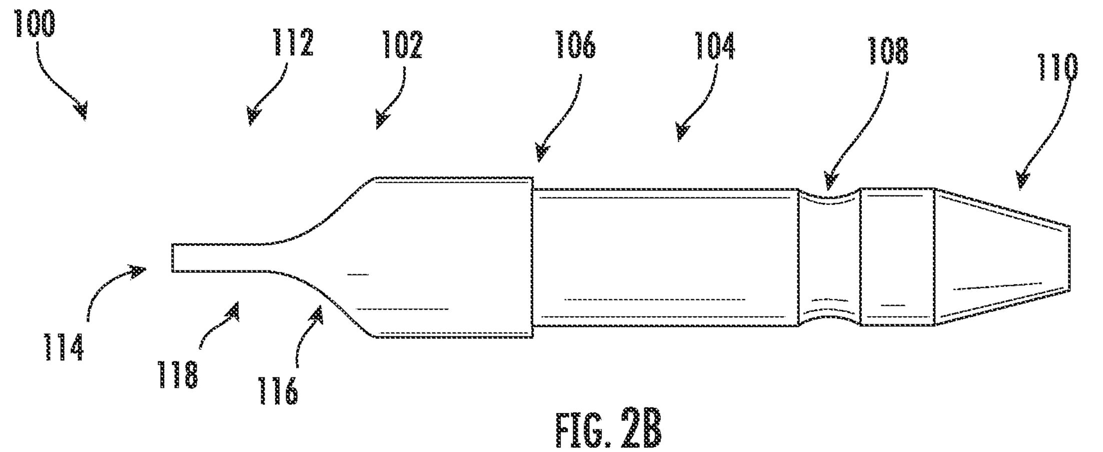
FIG. 2B is a top-view of the nib of FIG. 2A.
Figure 2C:
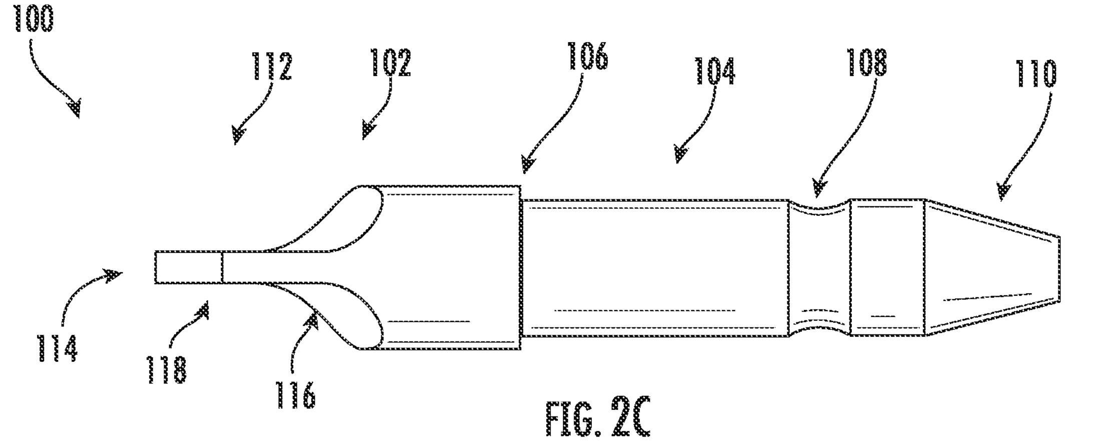
FIG. 2C is a bottom-view of the nib of FIG. 2B.

FIG. 1B is a perspective view of nib 100, FIG. 2A is a side view of nib 100, FIG. 2B is a top view of nib 100, and FIG. 2C is a bottom view of nib 100. Flattened chisel-shaped tip 112 of the flexible upper writing portion 102 includes a lower tapered portion 116 and an upper blade portion 118.

In some instances, the lower portion of the nib body is at least partially cylindrical. In other instances, the lower portion of the nib is another shape, such as rectangular in cross-section, triangular, oval-shaped, or another suitable shape. In some instances, the flexible upper writing portion is cylindrical at the middle boundary. In other instances, the flexible upper writing portion has another shape at the middle boundary, such as rectangular, triangular, oval-shaped, or another suitable shape. The flexible upper writing portion and the lower portion may have the same shape, such as both being cylindrical, or the flexible upper writing portion and the lower portion may have different shapes, such as one being cylindrical and one being rectangular. Any suitable combination of shapes may be used depending on the geometry of the writing instrument and aesthetic preferences.

In some instances, the groove in the lower portion is rounded along its surface. In other instances, the groove is rectilinear at its surface. The groove may have any suitable geometry for securing the nib in a writing instrument. The groove may be recessed within the lower portion, or the groove may protrude from the lower portion so that it resembles a ridge around the perimeter of the lower portion. The groove may be continuous around the perimeter of the nib body, or the groove may include multiple, discrete sections of groove.

In some instances, the groove is located proximal to the inferior end of the lower portion. In other instances, the groove is located in the lower portion proximal to the middle boundary. In other instances, the groove is located in the lower portion equidistant from the middle boundary and the inferior end of the lower portion.

In some instances, the inferior end of the lower portion has a truncated-cone shape resembling a cone with a flat end. In other instances, the inferior end of the lower portion has a cone-shape with a pointed end. In other instances, the inferior end of the lower portion is cylindrical and unchanged from the rest of the lower portion. The inferior end of the lower portion may have a rectangular cross-sectional shape, a pyramidal shape, or any suitable geometry for transferring ink.

In some instances, the flexible upper writing portion has a cross-sectional area greater than a cross-sectional area of the lower portion, i.e., a cylindrical flexible upper writing portion may have a diameter greater than the diameter of a cylindrical lower portion. The larger diameter of the flexible upper writing portion may result in a surface that contacts the body of a writing instrument when the nib body is inserted in a writing instrument. The middle boundary may define the flexible upper writing portion and the lower portion and define how much of the nib body protrudes from a writing instrument.

In some instances, the lower tapered portion of the flattened chisel-shaped tip is approximately equal in area to the upper blade portion. In other instances, the upper blade portion may be greater in area than the lower tapered portion. At the extreme, the area of the lower tapered portion may be miniscule to nonexistent, such that the flattened chisel-shaped tip includes only an upper blade portion and a rectilinear boundary between the upper blade portion and the rest of the flexible upper writing portion.

In some instances, the thickness of the upper blade portion of the flattened chisel-shaped tip is uniform, such that the upper blade portion in isolation resembles a rectangular prism. In other instances, the upper blade portion is tapered, with the thickness of the upper blade portion varying along a longitudinal axis of the nib body.

In some instances, the lower tapered portion of the flattened chisel-shaped tip has a curved taper such that the flexible upper writing portion transitions smoothly from the lower tapered portion of the flattened chisel-shaped tip to the upper blade portion. In other instances, the lower tapered portion has a flat taper, transitioning from the lower tapered portion to the upper blade portion at a sharp angle.

In some instances, the upper blade portion is angled relative to a perpendicular defined by a longitudinal axis of the nib body so as to change the effective angle at which the writing instrument is held by a user in use. In other instances, the upper blade portion is perpendicular to the longitudinal axis of the nib body.

Writing Instruments

Writing instruments are also disclosed herein. In one aspect, the writing instrument may include an elongated body having an ink reservoir and a nib body, such as any of the nib bodies described above. The nib body may have a lower portion disposed in the end of the elongated body and in fluid communication with the ink contained in the ink reservoir, and a flexible upper writing portion that protrudes from the end of the elongated body such that the nib body transfers ink from the ink reservoir to a writing surface. The flexible upper writing portion may reduce mechanical abrasion on the writing surface when in use by reducing an effective amount of application force for delivering ink.

Figure 3A:
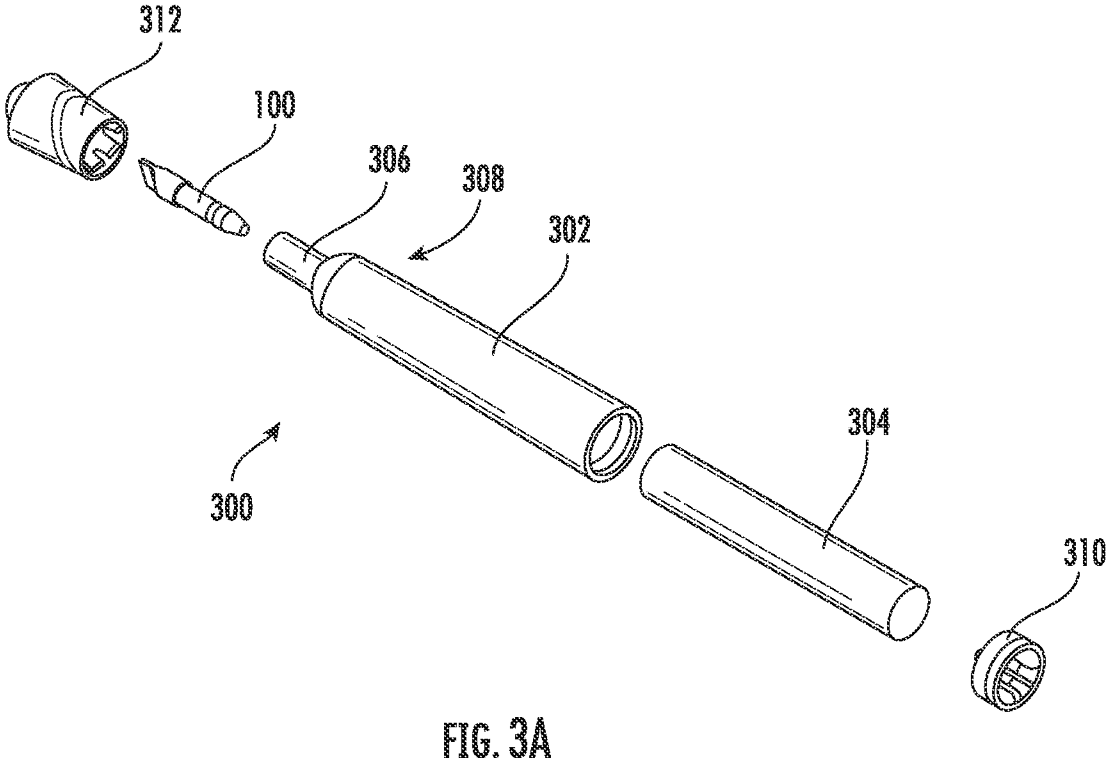
FIG. 3A is a perspective exploded view of a writing instrument in accordance with the present disclosure.
Figure 3B:
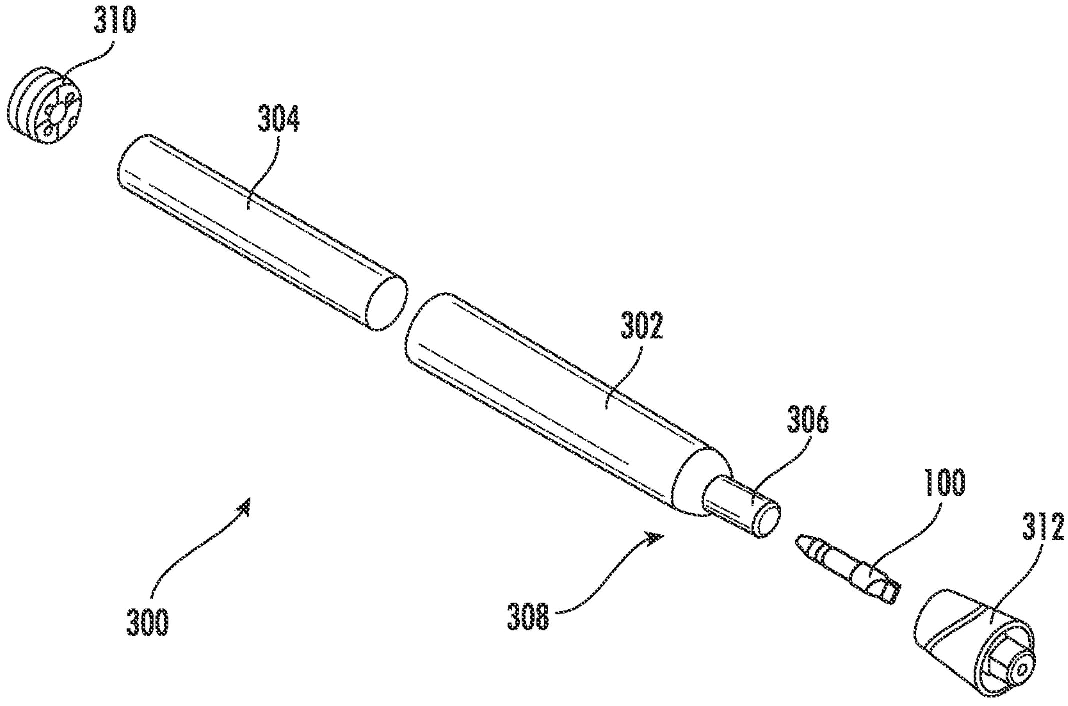
FIG. 3B is another perspective exploded view of the writing instrument of FIG. 3A.

FIGS. 3A and 3B are perspective exploded views of writing instrument 300 including an elongated body 302 having an ink reservoir 304 therein. A ferrule 306 is disposed at an end 308 of the elongated body 302 and is configured to support a nib 100. End plug 310 secures the ink reservoir 304 within the elongated body 302, and cap 312 preserves the nib body 100.

In some instances, the elongated body may by cylindrical. In other instances, the elongated body has a cross-section that is rectangular, triangular, or another suitable shape. The elongated body may have a relatively larger diameter to accommodate the ink reservoir and the ferrule may have a relatively smaller diameter to accommodate the nib body, or the elongated body and ferrule may have the same diameter depending on the size of the ink reservoir.

In some instances, the writing instrument includes an end plug to facilitate insertion of the ink reservoir, and possible replacement of a spent reservoir with a refill reservoir. The end plug may be removable, or it may not be removable. The writing instrument may not have an end plug, instead including a smooth continuous elongated body encasing the ink reservoir. In some instances, the writing instrument includes a cap. In other instances, the writing instrument includes a retraction mechanism for advancing and retracting the nib from the elongated body, such as a click-button and spring that results in alternating protrusion and extension of the nib.

Non-smear nibs and associated writing instruments have been provided. These nibs have a nib body with a flexible upper writing portion that reduces the required amount of application force to deliver ink.

Example 1: Force Study of Highlighting Written Text

A force study was performed by recording the force used by a pool of test subjects when using the flexible nib described herein and a variety of commercial highlighters on written text. The highlighters used are summarized in Table 1.

TABLE 1

Highlighters used in Force Study

| ID | Product |
|---|---|
| M | Tank highlighter, flexible chisel nib |
| Q | Tank highlighter, rigid chisel nib 1 |
| R | Tank highlighter, rigid chisel nib 2 |
| S | Tank highlighter, rigid chisel nib 3 |
| T | Tank highlighter, flexible paintbrush nib |
| U | Stick highlighter, rigid chisel nib 1 |
| V | Stick highlighter, rigid chisel nib 2 |
| X | Stick highlighter, rigid chisel nib 3 |
| Z | Stick highlighter, rigid chisel nib 4 |
| G | Stick highlighter, rigid blade nib 1 |
| H | Tank highlighter, rigid blade nib 2 |
| J | Tank highlighter, rigid blade nib 3 |
| K | Tank highlighter, rigid blade nib 4 |

Tank highlighters are those having relatively larger reservoirs, i.e., the writing instrument elongated body has a diameter larger than that of the ferrule. Stick highlighters are those having relatively smaller reservoirs, i.e., the writing instrument elongated body has a diameter approximately equal to that of the ferrule.

Each highlighter was used by a number n of test subjects and the force used to highlight written text was measured. As consumers each have distinct writing styles, including distinct instrument grasp, writing angle, and force application to achieve desired ink application, this test allows for direct comparison of the tested highlighters under real-world use conditions. The average force used by the test subjects was calculated and the peak force was recorded. The results can be seen in Table 2.

TABLE 2

Results of Force Study of Highlighters on Written Text

| ID | n | Average Force (lbs) | Standard Deviation (lbs) | Peak Force (lbs) |
|---|---|---|---|---|
| M | 33 | 0.102 | 0.068 | 0.332 |
| Q | 9 | 0.207 | 0.162 | 0.641 |

TABLE 2-continued

| Results of Force Study of Highlighters on Written Text | | | | |
|---|---|---|---|---|
| ID | n | Average Force (lbs) | Standard Deviation (lbs) | Peak Force (lbs) |
| R | 9 | 0.211 | 0.170 | 0.765 |
| S | 9 | 0.210 | 0.153 | 0.647 |
| T | 9 | 0.089 | 0.074 | 0.321 |
| U | 18 | 0.190 | 0.042 | 0.686 |
| V | 18 | 0.195 | 0.053 | 0.754 |
| X | 18 | 0.172 | 0.048 | 0.674 |
| Z | 18 | 0.189 | 0.055 | 0.659 |
| G | 6 | 0.169 | 0.065 | 0.589 |
| H | 6 | 0.177 | 0.072 | 0.677 |
| J | 6 | 0.216 | 0.071 | 0.734 |
| K | 6 | 0.271 | 0.067 | 0.813 |

Figure 4:
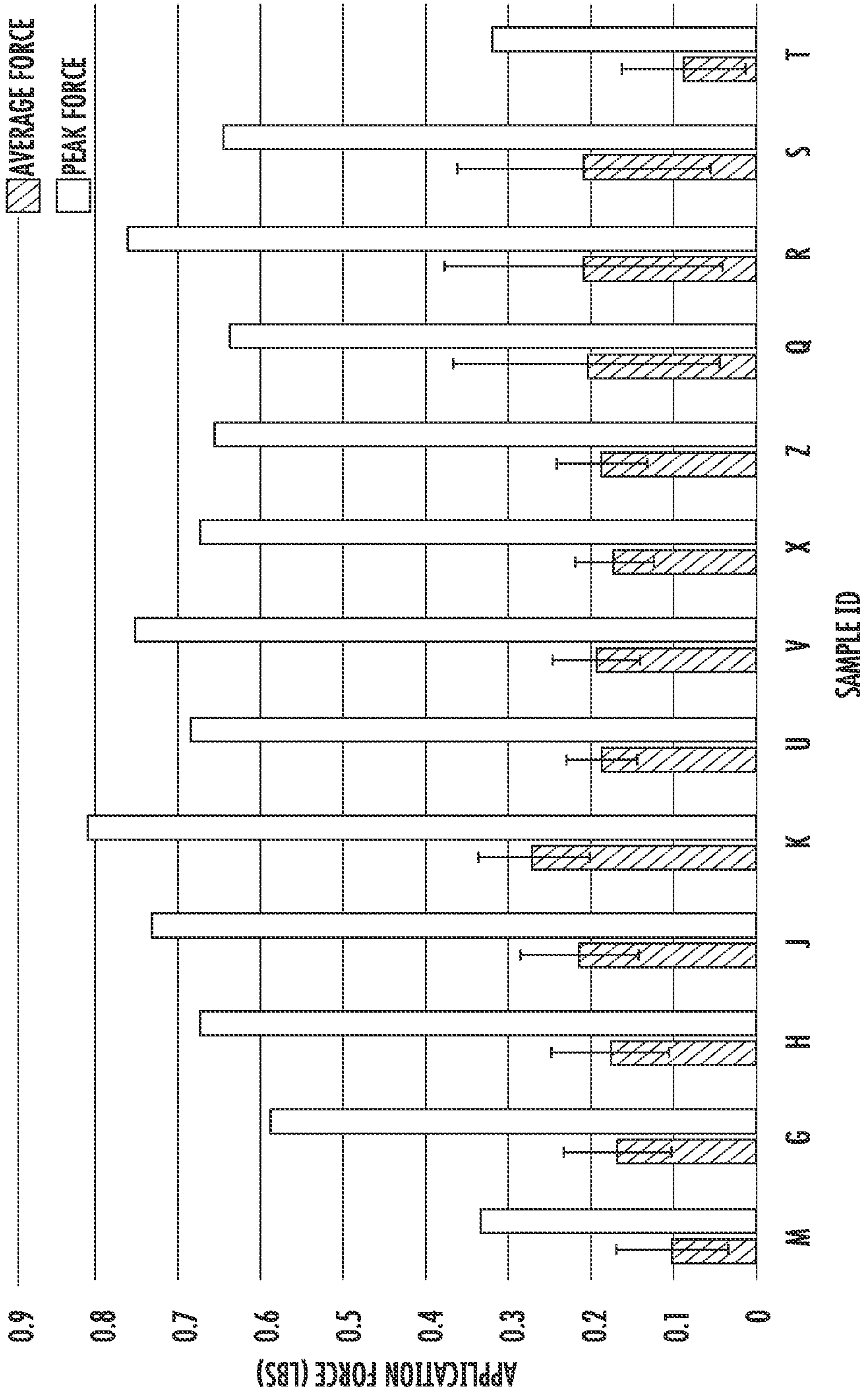
FIG. 4 is a chart of peak force and average force for a number of highlighters used on written text, as described in the Examples.

As shown in Table 2 and depicted in FIG. 4, the nib of the present disclosure is effective to deliver ink to the writing surface upon application of much less force as compared to 11 commercial highlighters, including all highlighters with rigid, chisel nibs.

Example 2: Force Study of Highlighting Printed Text

A force study was performed by recording the force used by a pool of test subjects when using the flexible nib described herein and a variety of commercial highlighters on printed text. The highlighters used are summarized in Table 1.

Each highlighter was used by a number of test subjects and the force used to highlight written text was measured. The average force used by the test subjects was calculated and the peak force was recorded. The results can be seen in Table 3.

TABLE 3

| Results of Force Study of Highlighters on Printed Text | | | | |
|---|---|---|---|---|
| ID | Sample Size | Average Force (lbs) | Standard Deviation (lbs) | Peak Force (lbs) |
| M | 32 | 0.065 | 0.044 | 0.260 |
| Q | 9 | 0.214 | 0.162 | 0.744 |
| R | 9 | 0.182 | 0.152 | 0.690 |
| S | 9 | 0.221 | 0.174 | 0.769 |
| T | 9 | 0.115 | 0.090 | 0.436 |
| U | 17 | 0.200 | 0.051 | 0.788 |
| V | 17 | 0.186 | 0.047 | 0.734 |
| X | 17 | 0.168 | 0.040 | 0.724 |
| Z | 17 | 0.183 | 0.052 | 0.743 |
| G | 6 | 0.160 | 0.073 | 0.653 |
| H | 6 | 0.171 | 0.061 | 0.710 |
| J | 6 | 0.173 | 0.058 | 0.637 |
| K | 6 | 0.229 | 0.063 | 0.852 |

Figure 5:
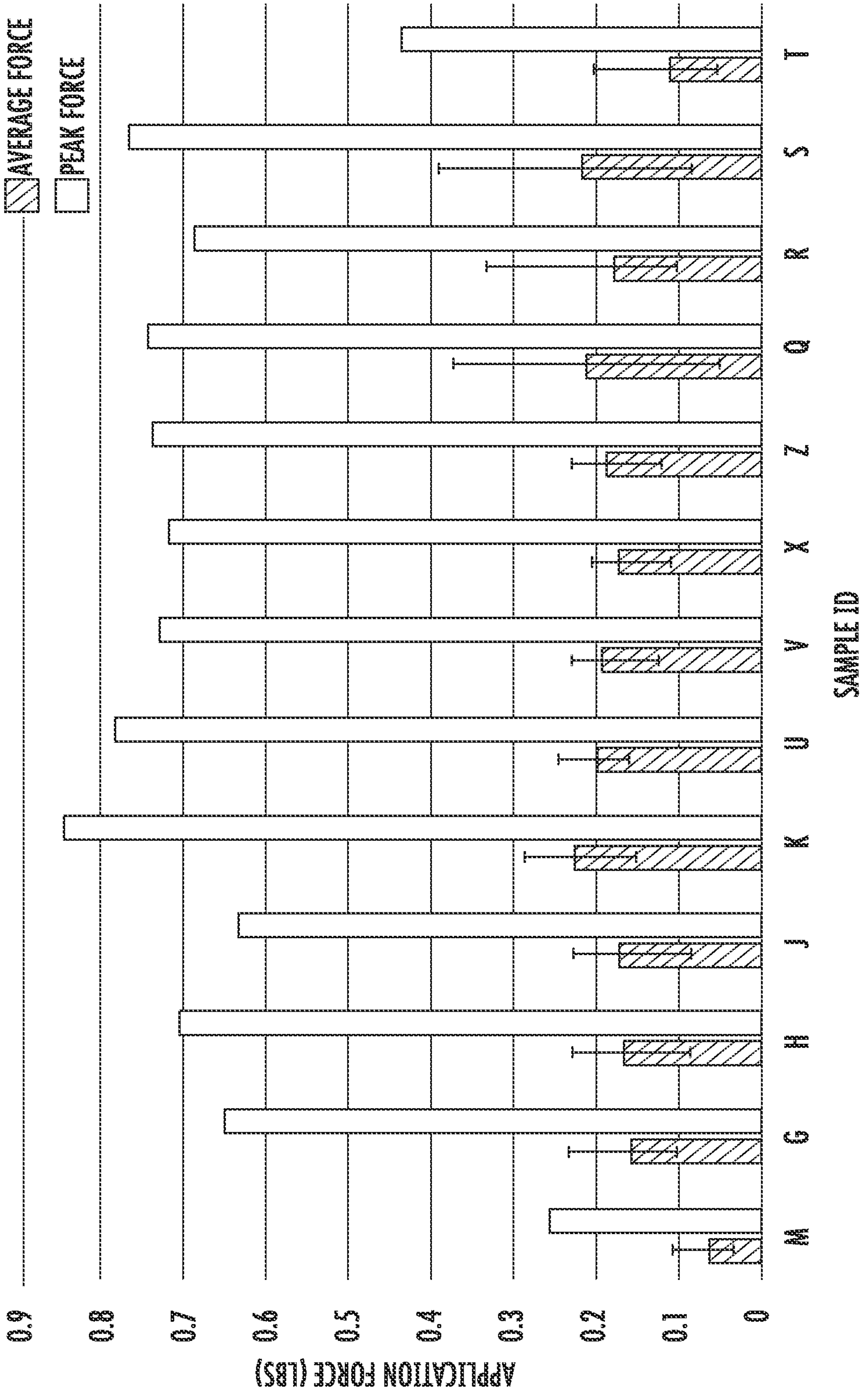
FIG. 5 is a chart of peak force and average force for a number of highlighters used on printed text, as described in the Examples.

As shown in Table 3 and depicted in FIG. 5, the nib of the present disclosure required much less application force as compared to all 12 commercial highlighters.

In a subsequent questionnaire, the participants of the force study rated the flexible nib described herein as easier to use (4.7 out of 7) than every other nib in the force study. The participants also rated the flexible nib as having an acceptable amount of pen ink smearing (5.8 about of 7), which was greater than every rigid blade nib and the flexible paintbrush nib. The flexible nib of the present disclosure therefore provides an acceptable amount of pen smearing in a form that is easier to use with less application force than typical commercial highlighters.

Example 3: Study of Line Width as a Function of Writing Angle

A line-width study was performed by mounting a series of highlighters in a mechanical apparatus and moving the highlighters across a writing surface to draw lines. The apparatus was configured to position the highlighters against a writing surface at a controlled angle, and the effect of writing angle on line width was analyzed. The results are summarized in FIG. 6.

Figure 6:
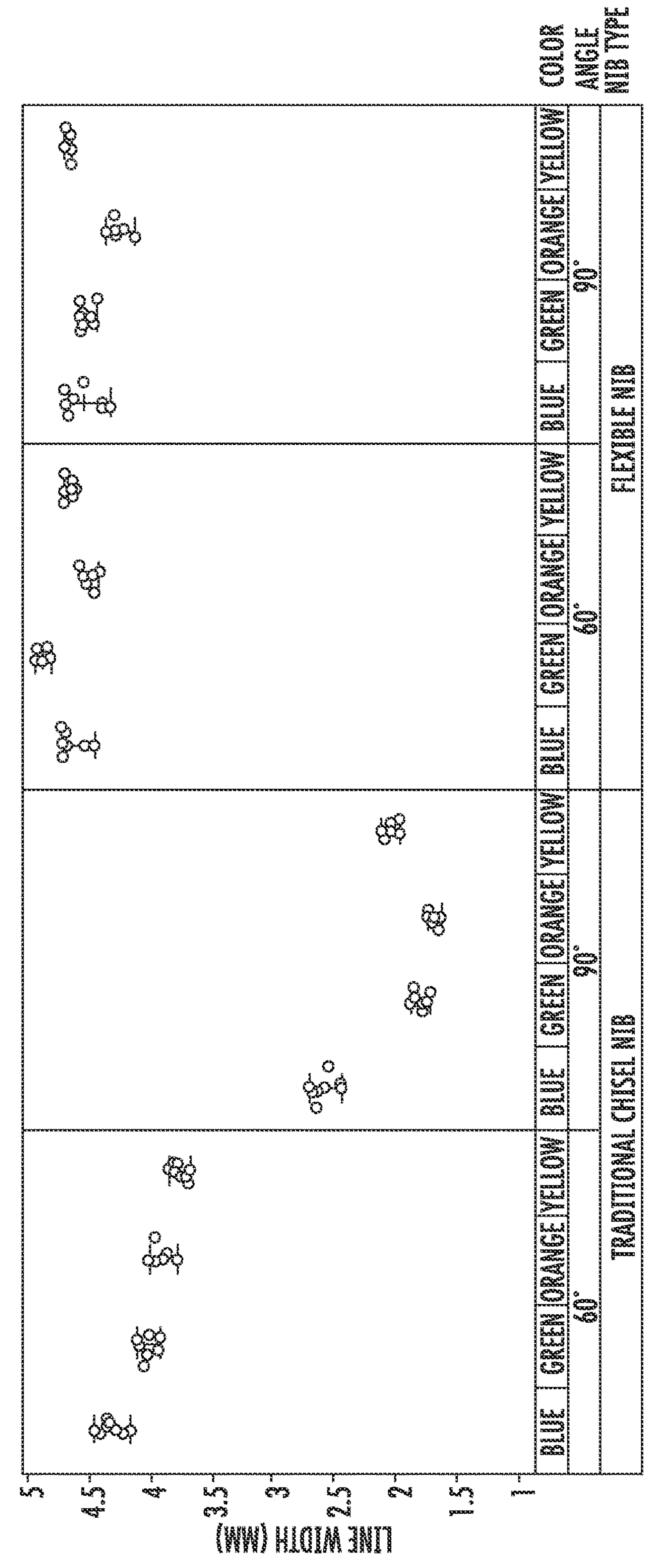
FIG. 6 is a graph of line widths for highlighters held at 60° and 90° for chisel nibs and flexible nibs in accordance with the present disclosure, as described in the Examples.

FIG. 6 is a graph of line widths drawn by highlighters equipped with a traditional chisel nib and by highlighters equipped with the flexible nib described herein. As shown in FIG. 6, each highlighter was used to draw two lines: a first line when held against the writing surface at an angle of 60°, and a second line when held against the writing surface at an angle of 90°. The width of the resulting lines was measured. To control for minor variations in ink behavior for different colors, the line widths were measured separately for four different colors.

As shown in the first quadrant of FIG. 6, when held at an angle of 60°, a highlighter equipped with a traditional chisel nib resulted in broad line widths varying from about 3 mm to about 4.5 mm. As shown in the second quadrant, when held at an angle of 90°, the same highlighter equipped with the traditional chisel nib resulted in significantly thinner line widths varying from about 1.5 mm to about 2.75 mm, a reduction of around 50%. In contrast and as shown in the third quadrant of FIG. 6, when a highlighter equipped with the flexible nib of this disclosure was held at an angle of 60°, the line widths were broad and varied from about 4 mm to about 5 mm. As shown in the fourth quadrant, when held at an angle of 90°, the same highlighter equipped with the flexible nib resulted in substantially the same broad line widths, varying from about 4 mm to about 4.75 mm. Therefore, a user highlighting with a highlighter equipped with the flexible nib requires fewer regrips and can more consistently draw lines of the same width without concern for writing angle and/or while holding the highlighter most comfortably. As a further consequence, the user will have less occasion for re-highlighting the same text.

While the disclosure has been described with reference to a number of embodiments, it will be understood by those skilled in the art that the disclosure is not limited to such disclosed embodiments. Rather, the disclosure can be modified to incorporate any number of variations, alterations, substitutions, or equivalent arrangements not described herein, but which are commensurate with the spirit and scope of the disclosure. Conditional language used herein, such as "can," "could," "might," or "may," unless specifically stated otherwise, or otherwise understood within the context as used, generally is intended to convey that certain embodiments include, while other embodiments do not include, certain features, elements or functional capabilities. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A nib for a writing instrument, comprising:

a nib body comprising a flexible upper writing portion and a lower portion in communication with the flexible upper writing portion, the lower portion of the nib body being configured to deliver ink to the flexible upper writing portion and the flexible upper writing portion being configured to deliver ink to a writing surface, wherein the flexible upper writing portion of the nib body comprises:

a flattened and angled chisel-shaped tip defining opposed flat faces at a superior end of the flexible upper writing portion, and a lower tapered portion extending symmetrically from each opposed flat face of the chisel-shaped tip in a direction towards the lower body portion of the nib;

wherein an entire surface of the superior end of the flexible upper writing portion is configured to contact the writing surface in-use, the surface having a width defined as the distance between the opposed flat faces that is from about 0.2 mm to about 2 mm, and wherein the width is less than or equal to half of a maximum diameter of the lower tapered portion; and wherein the nib is effective to deliver ink to the writing surface upon application of a force of less than about 0.1 lbs thereto, and wherein the chisel-shaped tip has a non-zero angle with respect to a central axis of the lower portion of the nib body.

2. The nib of claim 1, wherein the nib is effective to deliver ink to the writing surface upon application of a force of from about 0.06 lbs to about 0.1 lbs.

3. The nib of claim 1, wherein the nib is monolithic.

4. The nib of claim 1, wherein the lower portion of the nib body comprises a groove for securing the nib in a writing instrument.

5. The nib of claim 4, wherein the groove has a width of from about 1 mm to about 4 mm.

6. The nib of claim 1, wherein an inferior end of the lower portion of the nib body has a truncated-cone shape.

7. The nib of claim 1, wherein:

the flexible upper writing portion of the nib body and the lower portion of the nib body are joined at a middle boundary, the flexible upper writing portion of the nib body has a first diameter at the middle boundary and the lower portion of the nib body has a second diameter at the middle boundary, and the first diameter is greater than the second diameter.

8. The nib of claim 7, wherein:

an inferior end of the lower portion of the nib body has a truncated-cone shape, and the cone shape of the inferior end tapers from the second diameter to a third diameter.

9. The nib of claim 8, wherein the third diameter is from about 1 mm to about 5 mm.

10. The nib of claim 7, wherein the first diameter is from about 4 mm to about 8 mm.

11. The nib of claim 7, wherein the second diameter is from about 3 mm to about 7 mm.

12. The nib of claim 1, wherein the flattened chisel-shaped tip further comprises an upper blade portion angled relative to an axis perpendicular to a longitudinal axis of the nib body.

13. The nib of claim 1, wherein the nib body had a length of from about 15 mm to about 45 mm.

14. The nib of claim 1, wherein:

the nib is configured to generate a first line width when held against the writing surface at an angle of about 60°, the nib is configured to generate a second line width when held against the writing surface at an angle of about 90°, and the first line width and second line width are substantially the same.

15. The nib of claim 1, wherein the nib is a highlighter nib.

16. The nib of claim 1, wherein the nib is formed out of nylon 6, acrylic fiber, polyester fiber, nylon fiber, porous ceramic, synthetic fiber, synthetic felt, polyethylene, a porous plastic, felt, or a combination thereof.

17. A writing instrument, comprising:

an elongated body comprising an ink reservoir; and the nib of claim 1 disposed at an end of the elongated body and in fluid communication with the ink reservoir, wherein the flexible upper writing portion of the nib body protrudes outside of the elongated body.

18. The writing instrument of claim 17, wherein the writing instrument is a highlighter.

* * * * *